UNITED STATES PATENT OFFICE.

DANIEL Z. WOODS AND WILLIAM P. MACLAY, OF WURTSBOROUGH, NEW YORK.

COMPOSITION FOR BLACKENING AND DRESSING LEATHER.

SPECIFICATION forming part of Letters Patent No. 539,323, dated May 14, 1895.

Application filed January 10, 1895. Serial No. 534,482. (No specimens.)

*To all whom it may concern:*

Be it known that we, DANIEL Z. WOODS and WILLIAM P. MACLAY, citizens of the United States of America, residing at Wurtsborough, in the county of Sullivan and State of New York, have invented certain new and useful Improvements in Compositions for Blackening and Dressing Leather; and we do hereby declare the following to be a full, clear, and exact description of the invention, such as will enable others skilled in the art to which it appertains to make and use the same.

The object of this invention is to provide an improved leather dressing which when applied to leather will blacken the same, the composition being of such a nature that the black will remain permanently upon the leather.

In making the composition we employ an ingredient which is known to the trade as "Belgian black," the same being a coloring matter which is soluble in oil and not in water, the black being dissolved and mixed in an oil so as to permanently color the same and enter the leather therewith.

In carrying out our invention we take one pound of "Belgian black," thirty-three pounds of neat's-foot-oil, thirty-three pounds of tallow and thirty-three pounds of petrolatum. The "Belgian black" is permanently incorporated with the oil by being thoroughly dissolved therein.

"Belgian black" consists of fatty matter and a coloring substance, the fatty matter being stearic acid (commercial) and the coloring substance nigrosine. The nigrosine is ground up in the process of manufacture with the warm and softened stearic acid. "Belgian black" may be further described as a nigrosine coloring matter ground in fat acid.

"Petrolatum," which we use as an ingredient of the composition, is a fatty semi-solid mixture of the paraffin hydrocarbons, and is obtained by distilling off the lighter and more volatile portions from petroleum and purifying the residue.

The proportions of the ingredients may be varied, as when it is desired to make a paste rather than a liquid dressing more or less tallow can be added.

This composition is designed especially to be used as a harness-oil and dressing, and may also be used for blackening leather, as for example russet or tan leather, and when applied the leather becomes a permanent black and the coloring will not come off. The composition can be applied to fine leather goods for personal wear as well as to harness.

Having thus described our invention, we claim—

1. A leather dressing and coloring made up of neat's-foot-oil, tallow, petrolatum and a nigrosine coloring matter ground in fat acid, for the purpose set forth.

2. A leather dressing or coloring made up of one part of "Belgian black," or nigrosine coloring matter ground in fat acid, thirty-three parts of neat's-foot-oil, thirty-three parts of tallow, and thirty-three parts of petrolatum, substantially as set forth.

In testimony whereof we affix our signatures in presence of two witnesses.

DANIEL Z. WOODS.
WILLIAM P. MACLAY.

Witnesses:
   MAURICE E. STANTON,
   E. B. STANTON.